United States Patent Office 3,651,168
Patented Mar. 21, 1972

3,651,168
PRODUCTION OF HEPTENES
Armin Stoessel, Frankenthal, and Heinz Engelbach, Limburgerhof, Germany, assignors to Badische Anilin- & Soda-Fabrik Aktiengesellschaft, Ludwigshafen (Rhine), Germany
No Drawing. Filed Jan. 7, 1969, Ser. No. 789,586
Claims priority, application Germany, Jan. 9, 1968, P 16 43 735.7
Int. Cl. C07c 3/16
U.S. Cl. 260—683.15 C
14 Claims

ABSTRACT OF THE DISCLOSURE

Production of heptenes by reaction of propene with at least one butene in the presence of steam and a calcined phosphoric acid/silica gel catalyst, using a catalyst which contains from 10 to 50% by weight of phosphoric acid and treating this catalyst with water in the liquid phase before and/or during the reaction. The heptene products of the process are valuable starting materials for the production of plasticizers, synthetic resins and raw materials for surface coatings.

---

The invention relates to the production of heptenes by reaction of propene with butenes in the presence of phosphoric acid catalysts.

It is known that heptenes can be prepared by reaction of propene with butenes in the presence of phosphoric acid on a silicic acid carrier as catalyst (cf. Advances in Catalysis, volume VIII, p. 235; (Academic Press Inc., New York 1956)). Various methods are known for the production of the catalyst for this reaction (UOP Polymer Gasoline Process), for example by calcining appropriate carriers impregnated with phosphoric acid at 180° to 220° C. or 300° C. (U.S. patent specification Nos. 1,993,513 and 2,018,065) or up to 510° C. followed by steam treatment (U.S. patent specification No. 2,120,702). In addition to phosphoric acid and a carrier material, other substances have been used in the production of the catalyst, for example talc sepiolite, pyrophyllite (U.S. patent specification No. 3,050,472), sulfuric acid, sulfates (U.S. patent specification No. 3,244,767), aluminum halide (U.S. patent specification No. 2,596,497), metal oxides (U.S. patent specification No. 1,993,512 and French patent specification No. 1,374,756), metal chlorides (U.S. patent specification No. 1,993,512), and phosphates (UK patent specification No. 460,659). All these methods have the disadvantage that the catalyst rapidly becomes inactive, tar deposits form on it and the yields of heptene are inadequate. The activity and life of the catalyst are improved by adding water in liquid or gaseous form to the reaction mixture (U.S. patent specification No. 2,018,-066, UK patent specification No. 477,128 and No. 858,-047).

All the said methods give the best yields of heptene with catalysts which contain more than 50%, usually 60 to 80%, by weight of phosphoric acid, because catalysts having a lower content have too little activity and are substantially only capable of causing isobutene to react but not n-butene and propene. This is illustrated by the methods described in U.S. patent specification Nos. 2,102,-073 and 2,102,074, in which under the abovementioned conditions with a catalyst containing 30 to 40% by weight of phosphoric acid, only isobutene is reacted to a substantial extent in a mixture of isobutene, n-butene and propene; it is only in a subsequent step using a catalyst containing more than 50% of phosphoric acid that the remaining n-butene and propene reacts.

In the production of heptene it is preferred to use phosphoric acid catalysts because of their easy handling. Aluminum alkyls are proposed as catalysts in Belgian patent specification Nos. 548,684 and 574,599, but these are difficult to handle because of their sensitivity to air and moisture and difficult to separate from the reaction mixture. When alkali metals and alkali metal amides are used as catalysts (U.S. patent specification No, 2,881,-234 and UK patent specification No. 917,358) it is a disadvantage that the starting materials have to be entirely devoid of water.

The object of this invention is a new process for the production of heptenes in a simple way and in better yields.

This and other objects are achieved and heptenes are obtained advantageously by reaction of propene with butenes in the presence of steam and a calcined catalyst of phosphoric acid and silicic acid at elevated temperature and superatmospheric pressure when the catalyst contains from 10 to 50% by weight of phosphoric acid and is treated with water in the liquid phase prior to and/or during the reaction.

The process according to the invention, starting from propene and one or more of any of the isomers of butene, gives heptenes in better yields than the abovementioned methods and in a simple way. In view of the prior art, it is surprising that these results are achieved with catalysts containing up to 50% by weight of phosphoric acid. It was not to be foreseen that the said good results could be achieved not by an aftertreatment of the catalyst with steam, but solely by the treatment of the catalyst with water in liquid phase. It is also surprising that the catalyst should have such high selectivity as regards the formation of heptenes, secondary reactions such as polymerization or oligomerization of the starting materials with one another and/or of each individual component occurring to a considerably smaller extent than in the abovementioned methods. In contrast to all prior art catalysts, the catalysts according to this invention are not hygroscopic and, as compared with those having higher contents of phosphoric acid, cause no appreciable corrosion of the plant.

Propene and isobutene, butene-1 or butene-2 or mixtures of the same are used as starting materials. Mixtures such as are obtained for example by cracking petroleum and which may contain all the starting materials are preferred. Hydrocarbons, which are inert under the reaction conditions, for example ethane, propane and butane, may also be present in such mixtures. It is advantageous to use propene and the butene or butene mixture concerned in a molar ratio of 1:2, but other molar ratios may be chosen, particularly when not only heptene but also a by-product, for example octene in the case of an excess of butene, is to be produced in a higher yield. Heptenes which can be prepared with the said starting materials are mainly 2,3-dimethylpentene-2 and 3,4-dimethylpentene-2, but 2,4-dimethylpentene-2 and 2,3-dimethylpentene-1 may also be present as further essential compounds.

The reaction is carried out in the presence of catalysts which consist of phosphoric acid and the silicic acid carrier. Orthophosphoric acid, metaphosphoric acid and/or pyrophosphoric acid may be used for the preparation of the catalysts, which are advantageously applied as such or as aqueous or ammoniacal solutions to the carrier. Silicic acid in any form, for example precipitated silicic acid, silica gel or preferably diatomaceous earth, may be used as the carrier. The catalysts contain from 10 to 50%, preferably 20 to 40% by weight of phosphoric acid, calculated as orthophosphoric acid irrespective of the actual constitution. If they contain less than 10% or more than 50% by weight of acid, the yield of heptene declines. After the phosphoric acid has been applied to the carrier, the catalyst is dried and calcined. Calcination is carried out as a rule at temperatures of from 200° to 900° C., preferably from 250° to 600° C., the catalyst being heated in a reducing, oxidizing or inert atmosphere. When using ammoniacal solutions, calcination is generally carried out at from 400° to 900° C. It is advantageous to raise the temperature slowly during the calcination, on initial and end temperatures, the duration of the heating and of a treatment at an intermediate temperature, and the number and height of intermediate temperatures all being a matter of choice.

An essential feature of the invention is the treatment of the calcined catalyst with water in liquid form. The treatment may be carried out in any appropriate way, for example by dipping, spraying or soaking, before and/or during the reaction, the amount of water being a matter of choice. It is advantageous to use an amount of from 20 to 200% by weight, preferably from 30 to 100% by weight, with reference to the amount of catalyst. The treatment with water is generally carried out at a temperature of from 0° to 30° C., but temperatures of up to 100° C. or, when superatmospheric pressure is used, at 100° C. or more, but the water should always be in liquid form. Catalysts prepared in accordance with the process of this invention have a longer life (4 to 5 liters of polymer per gram of catalyst) than conventional phosphoric acid catalysts (cf. data regarding the life of catalysts in Emmett, Catalysis (Reinhold Publishing Corporation, New York) volume VI, p. 380). In batchwise operation, from 5 to 100% by weight, preferably from 10 to 50% by weight, of catalysts is generally used with reference to the propene-butene mixture. In continuous operation it is advantageous to use 0.5 to 5 liters, preferably 1 to 3 liters, of liquid propene-butene mixture per liter of catalyst per hour.

The reaction of the starting materials in the presence of the said catalysts is carried out at elevated temperature and superatmospheric pressure, as a rule at a temperature of from 150° to 300° C., preferably from 150° to 250° C., and at a pressure of from 50 to 150 atmospheres, preferably from 50 to 100 atmospheres, either continuously or batchwise. The reaction is carried out in the presence of steam in an amount (depending on the reaction temperature) of advantageously from 0.5 to 4% by weight, preferably from 0.5 to 1.5% by weight, with reference to the propene-butene mixture.

The reaction may be carried out as follows: An aqueous or ammoniacal solution of phosphoric acid is applied to a carrier in the said manner; the catalyst is then dried and calcined. After having been calcined, the catalyst is activated by treatment with water. In batch operation, a mixture of propene and butene is added to the catalyst and the mixture is kept at the said temperature and the said pressure for from two to five hours in an autoclave. The pressure may be set up before or during the reaction by means of inert gas, for example nitrogen. The mixture is then cooled and the heptene isolated by fractional distillation. In continuous operation, the catalyst treated in the manner described is introduced into a reactor. Reaction is then carried out in the presence of steam with continuous supply of a mixture of starting materials and continuous withdrawal of reaction mixture at the reaction temperature and the reaction pressure.

The reaction may also be carried out by treating with water during the reaction a catalyst which has not been pretreated with water; this may be done by spraying it with the abovementioned amount of water. The catalyst may also be treated with water in the liquid condition both before and during the reaction.

The compounds obtainable by the process according to the invention are valuable starting materials for the production of plasticizers, synthetic resins and raw materials for surface coatings. Reference is made to the abovementioned patent specifications as regards the use of the products.

The invention is illustrated by the following examples. The parts specified in the following examples are parts by weight.

EXAMPLE 1

The catalyst (30% by weight of pyrophosphoric acid on diatomaceous earth) is prepared as follows:

77.2 parts of pyrophosphoric acid is diluted with 90 parts of water and slowly added to 180 parts of diatomaceous earth chipping. The catalyst is then dried for two hours at 200° C. and heated for three hours at 300° C., one hour at 400° C. and half an hour each at 500° and 550° C.

EXAMPLE 2

The catalyst (20% by weight of pyrophosphoric acid on diatomaceous earth) is prepared in a manner analogous to that in Example 1 from 5 parts of pyrophosphoric acid, 13 parts of water and 20 parts of diatomaceous earth chippings.

EXAMPLE 3

The catalyst (40% by weight of pyrophosphoric acid on diatomaceous earth) is prepared in a manner analogous to that in Example 1 from 13.3 parts of pyrophosphoric acid, 5 parts of water and 20 parts of diatomaceous earth chippings.

EXAMPLE 4

The catalyst (30% by weight of pyrophosphoric acid with ammonia on diatomaceous earth) is prepared as follows: 19 parts of 28% aqueous ammonia solution is added to 8.6 parts of pyrophosphoric acid (pH value=9). 3 parts of water is added and the solution is applied to 20 parts of diatomaceous earth chippings and then the catalyst is dried for one hour at 200° C. and calcined for two hours at 500° C. and for four hours thirty minutes at 600° C.

EXAMPLE 5

The catalyst (30% by weight of pyrophosphoric acid; calcined up to 900° C.) is prepared analogously to that in Example 1, dried for two hours at 200° C. and calcined for three hours at 300° C., one hour at 400° C., half an hour at 500° C., half an hour at 550° C. one hour at 900° C.

EXAMPLE 6

The catalyst (30% by weight of pyrophosphoric acid; calcined at 300° C.) is prepared analogously to that in Example 1, dried for two hours at 200° C. and calcined at 300° C. for five hours.

EXAMPLE 7

The catalyst (30% by weight of pyrophosphoric acid with ammonia on diatomaceous earth) is prepared analogously to that in Example 4 and then treated for fifteen hours at 250° C. with steam.

EXAMPLE 8

The catalyst (30% by weight of pyrophosphoric acid on silica gel is prepared as described in Example 1 except that silica gel is used instead of diatomaceous earth.

EXAMPLE 9

The catalyst (32% by weight of 100% phosphoric acid on diatomaceous earth) is prepared as described in Example 1.

EXAMPLE 10

The catalyst (76% by weight of pyrophsphoric acid with ammonium on diatomaceous earth) is prepared as described in Example 4. Owing to the large amount of liquid which has to be applied to the carrier, the catalyst is dried several times during application.

EXAMPLE 11

The catalysts described in Examples 1 to 10 are activated by dripping 2 parts of water onto 5 parts of catalyst.

EXAMPLE 12

(a) An autoclave is filled with 5 parts of a catalyst prepared according to Example 1. Nitrogen is forced into the autoclave up to a pressure of 40 atmospheres and 28 parts of a liquid mixture of propene and isobutene are introduced in the molar ratio 1:1. The mixture is heated to 250° C. within two hours, and the autoclave is shaken for three hours at this temperature, cooled and released to atmospheric pressure. After the catalyst has been separated, 12 parts of reaction mixture (=42.9% of the theory) is obtained. This mixture contains 1.6 parts of heptene (=13.3% of the theory) which can be separated from the mixture by fractional distillation at a boiling point of from 74° to 98° C.

(b) An autoclave is filled with 5 parts of a catalyst which has been prepared according to Example 1 and then activated with water according to Example 11. Then nitrogen is forced in up to a pressure of 40 atmospheres and 28 parts of a mixture of propene and isobutene in the molar ratio 1:1 is also forced into the autoclave. The mixture is then heated within two hours to 250° C., and the autoclave is shaken for three hours at this temperature, cooled and released to atmospheric pressure. After the catalyst has been separated, 21.6 parts (=77.1% of the theory) of reaction mixture is obtained. 13.9 parts of heptene (=64.6% of the theory) is contained in this mixture.

EXAMPLES 13 TO 21

These examples, given in the table below, are carried out with the catalyst of Examples 2 to 10 by methods corresponding to those described under Example 12(a) and Example 12(b). In every case the starting mixture used is a mixture of propene and isobutene in the molar ratio 1:1. The following abbreviations are used in the table.

Ex=Example
Cat=Example from which catalyst is taken
—=not activated
+=activated
'=activated with steam
YP=yield of total mixture in parts
Y%=yield of total mixture in percent of the theory
HP=heptene in the total mixture in parts
H%=heptene in the total mixture in percent of the theory.

TABLE

| Ex. | Cat | YP | Y, percent | HP | H, percent |
|---|---|---|---|---|---|
| 13a | 2— | 12.7 | 45.3 | 3.4 | 26.8 |
| 13b | 2+ | 19.4 | 69.3 | 10.4 | 53.6 |
| 14a | 3— | 14.4 | 51.4 | 3.7 | 25.7 |
| 14b | 3+ | 21.8 | 77.9 | 12 | 55 |
| 15a | 4— | 0 | 0 | | |
| 15b | 4+ | 20.2 | 72.2 | 12.5 | 62 |
| 16a | 5— | 11.3 | 40.4 | 1.4 | 12.4 |
| 16b | 5+ | 20.3 | 72.5 | 11.3 | 55.6 |
| 17a | 6— | 13.9 | 49.7 | 2.9 | 20.9 |
| 17b | 6+ | 23 | 82 | 15.5 | 67.5 |
| 18a | 7' | 6 | 21.4 | 0.5 | 8.3 |
| 18b | 7+ | 19.8 | 70.6 | 12.2 | 61.6 |
| 19a | 8— | 14.7 | 52.5 | 2.9 | 19.7 |
| 19b | 8+ | 19 | 67.8 | 10.3 | 54.2 |
| 20b | 9+ | 9.7 | 34.6 | 4.7 | 48.5 |
| 21a | 10— | 5.1 | 18.2 | 1.1 | 21.6 |
| 21b | 10+ | 9.7 | 34.6 | 3.2 | 33 |

EXAMPLE 22

A vertical tube reactor surrounded by an oil jacket capable of being heated is filled with 163 parts of a catalyst prepared according to Example 9 and activated by dipping 84 parts of water onto it. The reactor is heater to 180° C. and about 151 parts per hour of a liquid mixture (98%) of propene and isobutene in the molar ratio 1:1 are introduced at the top at a pressure of 90 atmospheres.

2 parts of water are added to the liquid starting mixture at the top of the reactor every two hours. At the outlet from the reactor about 18 parts per hour of gaseous starting mixture and 133 parts of reaction mixture which contains 80.5 parts of heptene (=60.5% of the theory) are drawn off.

We claim:

1. In a process for the production of heptenes by reaction of propene with at least one butene in the presence of steam and a calcined catalyst of phosphoric acid on a silicic acid carrier at elevated temperature and superatmospheric pressure, the improvement which comprises using in said reaction said calcined catalyst which contains from 20 to 40% by weight of phosphoric acid, calculated as orthophosphoric acid, and treating said catalyst with water in the liquid phase before said reaction, the amount of water used for said treatment being from about 20 to 200% by weight with reference to the amount of catalyst.

2. A process as claimed in claim 1 wherein the reaction is carried out with propene and at least one butene in a molar ratio of 1:1.

3. A process as claimed in claim 1 wherein the amount of water used for said treatment is from 30 to 100% by weight with reference to the amount of catalyst.

4. A process as claimed in claim 1 wherein said treatment with water is carried out at a temperature of from 0° to 30° C.

5. A process as claimed in claim 1 wherein said reaction is carried out batchwise with from 5 to 100% by weight of catalyst with reference to the mixture of propene and butene.

6. A process as claimed in claim 1 wherein said reaction is carried out batchwise with from 10 to 50% by weight of catalyst with reference to the mixture of propene and butene.

7. A process as claimed in claim 1 wherein said reaction is carried out continuously with 0.5 to 5 liters of a liquid mixture of propane and butene per liter of catalyst per hour.

8. A process as claimed in claim 1 wherein said reaction is carried out at a temperature of from 150° to 300° C.

9. A process as claimed in claim 1 wherein said reaction is carried out at a temperature of from 150° to 250° C.

10. A process as claimed in claim 1 wherein said reaction is carried out at a pressure of from 50 to 150 atmospheres.

11. A process as claimed in claim 1 wherein said reaction is carried out at a pressure of from 50 to 100 atmospheres.

12. A process as claimed in claim 1 wherein said reaction is carried out in the presence of steam in an amount of 0.5 to 4% by weight with reference to the mixture of propene and butene.

13. A process as claimed in claim 1 wherein said reaction is carried out in the presence of steam in an amount of 0.5 to 1.5% by weight with reference to the mixture of propene and butene.

14. A process as claimed in claim 1 wherein the silicic carrier is diatomaceous earth.

References Cited

UNITED STATES PATENTS

| 2,102,074 | 12/1937 | Ipatieff et al. | 260—683.15 |
| 2,694,686 | 11/1954 | Reeves et al. | 260—683.15 X |
| 2,824,149 | 2/1958 | Corner et al. | 260—683.15 |
| 3,255,273 | 6/1966 | Catterall | 260—683.15 |

PAUL M. COUGHLAN, JR., Primary Examiner

PO-1050
(5/69)

UNITED STATES PATENT OFFICE
CERTIFICATE OF CORRECTION

Patent No. 3,651,168          Dated March 21, 1972

Inventor(s) Armin Stoessel and Heinz Engelbach

It is certified that error appears in the above-identified patent and that said Letters Patent are hereby corrected as shown below:

Column 3, line 7, "on initial" should read -- the initial --.

Column 4, line 10, "chipping" should read -- chippings --; line 58, "on silica gel" should read -- on silica gel) --; Column 5, line 68, "dipping 84 parts of water onto it. The reactor is heater" should read -- dripping 84 parts of water onto it. The reactor is heated --.

Signed and sealed this 19th day of September 1972.

(SEAL)
Attest:

EDWARD M. FLETCHER, JR.          ROBERT GOTTSCHALK
Attesting Officer                 Commissioner of Patents